United States Patent [19]

Isobe et al.

[11] Patent Number: 5,019,333

[45] Date of Patent: May 28, 1991

[54] ZIRCONIUM ALLOY FOR USE IN SPACER GRIDS FOR NUCLEAR REACTOR FUEL CLADDINGS

[75] Inventors: Takeshi Isobe; Yutaka Matsuo, both of Omiya; Yasuo Ichihara, Naka, all of Japan

[73] Assignees: Mitsubishi Metal Corporation; Mitsubishi Nuclear Fuel Co., Ltd., both of Tokyo, Japan

[21] Appl. No.: 419,139

[22] Filed: Oct. 10, 1989

[30] Foreign Application Priority Data

Oct. 26, 1988 [JP] Japan .................................. 63-270112

[51] Int. Cl.$^5$ .............................................. C22C 16/00
[52] U.S. Cl. .................................... 420/422; 376/438; 376/444; 376/462; 376/900
[58] Field of Search ................. 420/422; 376/438, 444, 376/462, 900

[56] References Cited

U.S. PATENT DOCUMENTS

| | | | |
|---|---|---|---|
| 3,261,682 | 7/1966 | Roslev | 75/177 |
| 3,775,823 | 12/1973 | Adolph et al. | 29/182.5 |
| 4,065,328 | 12/1977 | Cheadle | 148/12.7 B |
| 4,094,706 | 6/1978 | Schulson et al. | 148/11.5 F |
| 4,197,145 | 4/1980 | Hanneman et al. | 148/11.5 |
| 4,212,686 | 7/1980 | Lunde et al. | 148/11.5 |
| 4,226,647 | 10/1980 | Schulson et al. | 148/32.5 |
| 4,649,023 | 3/1987 | Sabol et al. | 420/422 |
| 4,707,330 | 11/1987 | Ferrari | 376/457 |
| 4,876,064 | 10/1989 | Taylor | 420/422 |

FOREIGN PATENT DOCUMENTS 1004205 9/1965 United Kingdom .

*Primary Examiner*—Stephen J. Lechert, Jr.
*Assistant Examiner*—N. Bhat
*Attorney, Agent, or Firm*—Frishauf, Holtz, Goodman & Woodward

[57] ABSTRACT

A zirconium alloy for use in spacer grids for nuclear reactor fuel claddings, which consists essentially of, on a weight percent basis, 2.5 to 10% Nb, 0.01 to 1.5% of one or more components selected from the group consisting of Y and rare earth elements and oxides thereof, 0.05 to 1% of one or more optional element selected from the group consisting of Fe, Cr, Mo and V, and the remainder Zr and incidental impurities.

20 Claims, No Drawings

ZIRCONIUM ALLOY FOR USE IN SPACER GRIDS FOR NUCLEAR REACTOR FUEL CLADDINGS

FIELD OF THE INVENTION

The present invention relates to a zirconium alloy which exhibits excellent tensile strength and corrosion resistance and is able to maintain such properties at high levels, when used in spacer grids for nuclear reactor fuel claddings fabricated by welding operations.

BACKGROUND OF THE INVENTION

Generally, the spacer grids for nuclear reactor fuel claddings are required to exhibit high tensile strength and corrosion resistance, and accordingly some zirconium alloys have recently been used in producing such spacer grids.

An example of such a zirconium alloy is described in Japanese Patent Public Disclosure No. 13550/1987, which is comprised, on a weight percent basis of 0.5-10% Nb, 0.01-5% of one or more elements selected from the group consisting of Fe, Cr, Ni, V, Mn, Mo, C and Si and the remainder Zr and incidental impurities, and another zirconium alloy is described in Japanese Patent Public Disclosure No. 140678/1983, which is comprised, on a weight percent basis of 5-25% Nb, 0.1-1% of Fe and/or Cr, the remainder Zr and incidental impurities.

As the spacer grids for nuclear reactor fuel claddings are usually constructed by welding of the Zr alloy members, the tensile strength and the corrosion resistance at the welded zone deteriorates, resulting in a relatively short life span thereof.

With a view to improving the conventional Zr alloy so as to be capable of maintaining its tensile strength and corrosion resistance even after it has been welded to form spacer grids, efforts are being made to develop a novel alloy which does not show any deterioration in its tensile strength and corrosion resistance.

As a result of such efforts, the inventors of the present invention have found that such an alloy may be produced by adding Nb and one or more components selected from the group consisting of Y and rare earth elements and oxides thereof, and optionally one or more elements selected from the group consisting of Fe, Cr, Mo and V to the conventional Zr alloy.

SUMMARY OF THE INVENTION

The present invention relates to a novel zirconium alloy which has been developed on the basis of these findings and the zirconium alloy consists essentially of, on a weight percent basis,
- 2.5 to 10% Nb,
- 0.01 to 1.5% of one or more components selected from the group consisting of Y and rare earth elements and oxides thereof,
- 0.05 to 1% of one or more optional elements selected from the group consisting of Fe, Cr, Mo and V, and the remainder Zr and incidental impurities.

Spacer grids for nuclear reactor fuel claddings made from the Zr alloy of the present invention exhibit high tensile strength and corrosion resistance and can maintain such properties at high levels even when employed in welded zones.

DETAILED EXPLANATION OF THE INVENTION

The present invention has been accomplished on the basis of the findings as above-mentioned. The technical reasons why each of the components in the Zr alloy of the present invention are limited in compositional range (on the weight percent basis) is explained below.

(a) Nb

This is a component that contributes improved strength to the alloy. If its content is less than 2.5%, a desirable tensile strength cannot be ensured. If its content exceeds 10%, the workability of the alloy tends to decrease. The content of Nb in the alloy of the present invention is therefore limited to within the general range of 2.5 to 10%. In addition to that, if the Nb content is less than 4%, the tensile strength is not fully realized. On the other hand, if the Nb content exceeds 7.5%, a remarkable improvement in corrosion resistance is no longer exhibited. Accordingly, the Nb content is limited to within a preferable range of 4 to 7.5%.

(b) Y and rare earth element and oxides thereof

Y or any of rare earth elements are instantly converted into a thermally very stable oxide thereof immediately after being added to the molten Zr alloy, and will exhibit the same behavior as in the case of the oxides which are added.

Although the behavior of the oxide of Y or rare earth elements, when added to a Zr alloy, has not yet been fully clarified, the oxide will precipitate along the grain boundaries, while molten Zr alloy is solidified thereby inhibiting the grain growth. Such an action of inhibiting the grain growth seems to prevent the decrease of the properties of high tensile strength and corrosion resistance at the welded zone as well as at other non-welded zones. In other words, these components act to inhibit the reduction of such properties in welded zones as well as in other non-welded zones. If the sum of these components is less than 0.01%, the intended degree of the above-said advantages will not be attained. On the other hand, if the sum of these components exceeds 1.5%, there will be no commensurate improvement in such advantageous effects. Accordingly, the total content of these components in the Zr alloy is limited to be within the range of 0.01 to 1.5%, for purposes of lost efficiency.

(c) Fe, Cr, Mo and V

These elements are optionally added to the Zr alloy and are effective in providing an improved tensile strength, creep characteristics and corrosion resistance of the resultant Zr alloy, when Nb is simultaneously contained in the alloy. If one or more of these elements are incorporated in a total amount of less than 0.05%, the above-mentioned advantageous effects are not attained. If the total content of one or more of these elements exceeds 1%, the corrosion resistance of the resultant Zr alloy tends to deteriorate. The total content of one or more of these elements is therefore limited to be within the range of 0.05 to 1%.

EXAMPLE

The Zr alloy of the present invention is hereunder described more specifically by means of an example.

A molten alloy having the composition listed in Tables 1 and 2 was produced in an ordinary consumable electrode high frequency vacuum arc furnace. The melts were cast into ingots each having a diameter of 110 mm, length of 120 mm and weight of 10 kg. The ingots were hot forged at 1010° C. into plates each having a width of 115 mm, thickness of 40 mm and length of 170 mm. The resultant plates were subjected to a hardening treatment consisting of heating at 1010° C. and quenching in water. The hardened plates were hot rolled at 820° C. into sheets each having a thickness of 4.5 mm and were then annealed at 590° C. for 4 hours, followed by cooling in an Argon gas atmosphere. The annealed sheets were then cold rolled at a 50% rolling ratio, followed by the above-mentioned annealing treatment. A combination of these cold rolling and annealing treatments was once again applied to the first cold rolled sheets in order to obtain alloy sheet test specimens Nos. 1–44 having a thickness of 1 mm, as shown in Tables 1 and 2.

The comparative test specimens Nos. 51–88 having the same dimensions as said test specimens Nos. 1–44, but having different alloy compositions from that of the test specimens Nos. 1–44 (content of one or more components is outside the scope of the alloys of the present invention, as indicated by asterisks in Tables 3 and 4) were also produced in the same way as for the test specimens Nos. 1–44.

Then, four smaller pieces each having a width of 25 mm and length of 60 mm, and two larger pieces each having a width of 25 mm and length of 120 mm were cut out from the test specimens Nos. 1–44 and from the The shorter side of each of the smaller pieces was butted with that of another smaller piece and welded along the butted line by using a LASER beam. Thus, two welded test specimens each having a width of 25 mm, length of 120 mm and a central welded seam which traversed the piece widthwise, were prepared. Then, a test specimen having a gauge length of 50 mm and a traversing welded seam at the center was cut out for a tensile test from one of the two welded sheets.

Another tensile test specimen having the same dimension was cut off from the non-welded large pieces.

These two tensile test specimens and the other test specimens for measuring corrosion resistance were subjected to a solution treatment comprising holding each of the test specimens at a temperature of 750° C. for 2 hours and quenching it in Argon gas atmosphere, followed by an aging treatment of holding it at a temperature of 500° C. for 24 hours.

Then, the tensile test was conducted at temperature of 316° C.±5° C., and a corrosion resistance test was also conducted by holding the test specimens in a high temperature and pressure steam atmosphere of 400° C. and 105 atm., which is similar to the environment to which the spacer grids for nuclear reactor fuel claddings are exposed, for 720 hours, in order to measure the weight gain of the test specimens due to oxidation.

TABLE 1

| test speci-men No. | alloy composition (wt. %) | | | | | | | Zr + impu-rities | tensile strength at 400° C. (kg/mm$^2$) | | weight gain by oxidation (mg/dm$^2$) | |
|---|---|---|---|---|---|---|---|---|---|---|---|---|
| | Nb | Y | rare earth elements | Fe | Cr | Mo | V | | parent metal | weld metal | parent metal | weld metal |
| Zr alloy sheets according to the present invention | | | | | | | | | | | | |
| 1 | 2.55 | 0.04 | — | — | — | — | — | bal. | 31.3 | 31.5 | 50.1 | 58.6 |
| 2 | 4.98 | 0.06 | — | — | — | — | — | " | 55.0 | 54.4 | 64.7 | 73.3 |
| 3 | 7.44 | — | Nd:0.03 | — | — | — | — | " | 61.4 | 62.6 | 79.4 | 87.7 |
| 4 | 9.75 | 0.05 | — | — | — | — | — | " | 68.2 | 68.0 | 84.6 | 89.5 |
| 5 | 2.52 | 0.05 | — | — | — | — | 0.54 | " | 33.2 | 32.9 | 47.1 | 55.9 |
| 6 | 5.13 | 0.07 | — | — | — | 0.32 | — | " | 58.0 | 58.6 | 62.8 | 64.0 |
| 7 | 7.48 | — | Nd:0.013 | — | 0.78 | — | — | " | 70.2 | 69.8 | 74.9 | 80.3 |
| 8 | 9.86 | 0.94 | — | 0.052 | — | — | — | " | 68.1 | 68.8 | 84.4 | 89.5 |
| 9 | 6.05 | — | Tb:0.02 | 0.79 | — | — | — | " | 65.5 | 64.6 | 73.2 | 75.1 |
| 10 | 6.11 | 0.13 | Yb:0.06 | — | 0.054 | — | — | " | 57.3 | 57.7 | 76.5 | 80.3 |
| 11 | 6.06 | 0.24 | — | — | — | 0.97 | — | " | 65.8 | 66.2 | 72.3 | 77.8 |
| 12 | 6.03 | — | Yb:0.05 | — | — | — | 0.056 | bal. | 56.9 | 55.7 | 76.0 | 79.9 |
| 13 | 6.07 | 0.22 | — | 0.42 | 0.33 | — | — | " | 64.4 | 64.0 | 73.7 | 75.6 |
| 14 | 6.04 | 0.15 | — | 0.32 | — | 0.07 | — | " | 60.2 | 59.7 | 76.5 | 80.8 |
| 15 | 6.04 | — | Nd:0.93 | 0.24 | — | — | 0.70 | " | 64.7 | 65.8 | 73.1 | 76.4 |
| 16 | 6.02 | 0.016 | — | 0.15 | 0.13 | 0.58 | — | " | 64.1 | 63.3 | 72.2 | 74.7 |
| 17 | 6.02 | — | Ho:0.12 | — | 0.24 | 0.26 | 0.11 | " | 62.2 | 64.0 | 73.9 | 76.0 |
| 18 | 6.10 | 0.11 | Tb:0.03 | 0.24 | 0.13 | 0.11 | 0.34 | " | 67.4 | 67.2 | 73.0 | 74.5 |
| 19 | 3.95 | 0.05 | — | — | — | 0.21 | — | " | 41.5 | 40.9 | 59.0 | 62.5 |
| 20 | 4.10 | 0.07 | — | — | — | — | 0.33 | " | 44.6 | 44.1 | 59.1 | 65.2 |
| 21 | 7.59 | — | Nd:0.10 | 0.12 | — | 0.05 | — | " | 63.5 | 63.9 | 78.8 | 81.4 | comparative test specimens Nos. 51–88.

TABLE 2

| test speci-men No. | alloy composition (wt. %) | | | | | | | Zr + impu-rities | tensile strength at 400° C. (kg/mm$^2$) | | weight gain by oxidation (mg/dm$^2$) | |
|---|---|---|---|---|---|---|---|---|---|---|---|---|
| | Nb | Y$_2$O$_3$ | oxides of rare earth elements | Fe | Cr | Mo | V | | parent metal | weld metal | parent metal | weld metal |
| Zr alloy sheets according to the present invention | | | | | | | | | | | | |
| 22 | 2.53 | 0.05 | — | — | — | — | — | bal. | 32.2 | 32.8 | 48.8 | 52.1 |
| 23 | 3.96 | 0.09 | — | — | — | — | — | " | 40.8 | 41.2 | 56.6 | 60.2 |
| 24 | 4.05 | 0.21 | — | — | — | — | — | " | 41.9 | 42.2 | 58.1 | 65.6 |
| 25 | 5.23 | 0.52 | — | — | — | — | — | " | 53.6 | 53.3 | 61.5 | 66.7 |
| 26 | 7.47 | 0.13 | — | — | — | — | — | " | 63.3 | 62.8 | 75.3 | 78.8 |
| 27 | 7.65 | 0.11 | — | — | — | — | — | " | 64.8 | 65.0 | 78.2 | 81.3 |

TABLE 2-continued

| test specimen No. | alloy composition (wt. %) | | | | | | | Zr + impurities | tensile strength at 400° C. (kg/mm²) | | weight gain by oxidation (mg/dm²) | |
|---|---|---|---|---|---|---|---|---|---|---|---|---|
| | Nb | Y₂O₃ | oxides of rare earth elements | Fe | Cr | Mo | V | | parent metal | weld metal | parent metal | weld metal |
| 28 | 9.88 | 0.15 | — | — | — | — | — | " | 70.6 | 70.1 | 83.3 | 87.1 |
| 29 | 2.59 | — | Yb:0.02 | 0.53 | — | — | — | " | 37.6 | 36.9 | 44.5 | 49.9 |
| 30 | 3.91 | — | Nd:0.03 | — | 0.83 | — | — | " | 47.9 | 48.4 | 56.3 | 59.2 |
| 31 | 5.11 | — | Tb:0.05 | — | — | 0.055 | — | " | 53.3 | 53.8 | 59.2 | 62.5 |
| 32 | 7.40 | — | Ho:0.11 | — | — | — | 0.21 | " | 65.7 | 65.0 | 71.4 | 75.3 |
| 33 | 9.93 | — | Nd:0.44 | — | 0.059 | — | — | " | 72.2 | 72.1 | 79.9 | 84.0 |
| 34 | 5.12 | 0.88 | — | 0.052 | — | — | — | bal. | 53.9 | 53.6 | 60.0 | 64.8 |
| 35 | 5.08 | 0.46 | — | — | 0.41 | — | — | " | 58.1 | 57.7 | 57.1 | 59.9 |
| 36 | 5.22 | 0.07 | — | — | — | 0.18 | — | " | 56.4 | 55.9 | 58.9 | 63.7 |
| 37 | 5.10 | 0.015 | — | — | — | — | 0.060 | " | 54.1 | 54.4 | 60.2 | 63.8 |
| 38 | 5.05 | — | Nd:0.78 | 0.94 | — | 0.08 | — | " | 63.5 | 62.8 | 61.1 | 64.0 |
| 39 | 4.98 | — | Nd:0.51 | — | 0.07 | — | 0.84 | " | 61.8 | 62.3 | 60.5 | 63.2 |
| 40 | 5.13 | 0.93 | — | 0.22 | 0.13 | — | — | " | 56.6 | 56.9 | 57.5 | 60.1 |
| 41 | 5.05 | 0.47 | — | — | 0.14 | 0.33 | — | " | 58.9 | 58.1 | 55.6 | 58.9 |
| 42 | 5.14 | — | Yb:0.51 | 0.19 | 0.08 | — | 0.11 | " | 56.6 | 57.0 | 56.2 | 58.8 |
| 43 | 5.11 | — | Tb:0.43 | 0.23 | 0.07 | 0.20 | — | " | 58.4 | 58.1 | 57.7 | 60.2 |
| 44 | 5.06 | 0.10 | Nd:0.05 | 0.25 | 0.10 | 0.18 | 0.09 | " | 57.9 | 57.2 | 57.1 | 59.6 |

TABLE 3

| test specimen No. | alloy composition (wt. %) | | | | | | | Zr + impurities | tensile strength at 400° C. (kg/mm²) | | weight gain by oxidation (mg/dm²) | |
|---|---|---|---|---|---|---|---|---|---|---|---|---|
| | Nb | Y | rare earth elements | Fe | Cr | Mo | V | | parent metal | weld metal | parent metal | weld metal |
| comparative Zr alloy sheets | | | | | | | | | | | | |
| 51 | 2.14* | 0.05 | — | — | — | — | — | bal. | 19.3 | 18.8 | 45.0 | 51.1 |
| 52 | 1.87* | 0.07 | — | — | — | — | — | " | 17.0 | 17.5 | 39.9 | 46.3 |
| 53 | 2.01* | — | Nd:0.012 | — | — | — | — | " | 19.1 | 19.2 | 42.5 | 49.4 |
| 54 | 1.74* | 0.94 | — | — | — | — | — | " | 18.7 | 19.4 | 38.0 | 43.8 |
| 55 | 1.91* | 0.05 | — | 0.54 | 0.09 | — | — | " | 24.3 | 25.0 | 39.6 | 45.5 |
| 56 | 2.05* | 0.12 | Ho:0.03 | 0.12 | — | 0.64 | 0.10 | " | 25.1 | 24.4 | 39.2 | 46.1 |
| 57 | 1.69* | 0.09 | Nd:0.02 | 0.15 | 0.07 | 0.08 | 0.05 | " | 19.8 | 19.8 | 36.4 | 40.2 |
| 58 | 6.04 | — | Tb:0.02 | 1.16* | — | — | — | " | 67.1 | 65.9 | 103.6 | 125.0 |
| 59 | 6.10 | 0.14 | Yb:0.06 | — | 1.23* | — | — | " | 66.1 | 66.4 | 114.7 | 118.9 |
| 60 | 6.06 | 0.24 | — | — | — | 1.19* | — | " | 68.4 | 67.1 | 124.6 | 126.8 |
| 61 | 6.01 | — | Nd:0.78 | — | — | — | 1.32* | bal. | 66.6 | 66.2 | 121.9 | 130.4 |
| 62 | 2.62 | —* | —* | — | — | — | — | " | 28.4 | 17.4 | 47.3 | 88.3 |
| 63 | 5.95 | —* | —* | — | — | — | — | " | 57.1 | 38.2 | 57.2 | 91.6 |
| 64 | 8.93 | —* | —* | — | — | — | — | " | 65.5 | 43.8 | 83.7 | 135.9 |
| 65 | 6.03 | —* | —* | 0.32 | — | 0.07 | — | " | 60.3 | 41.0 | 76.5 | 114.3 |
| 66 | 6.04 | —* | —* | 0.25 | — | — | 0.71 | " | 66.4 | 43.9 | 72.8 | 120.6 |
| 67 | 6.01 | —* | —* | 0.15 | 0.13 | 0.57 | — | " | 64.0 | 43.0 | 71.9 | 118.0 |
| 68 | 6.00 | —* | —* | — | 0.23 | 0.26 | 0.12 | " | 62.7 | 40.8 | 74.0 | 126.4 |
| 69 | 6.12 | —* | —* | 0.23 | 0.13 | 0.10 | 0.34 | " | 64.9 | 45.1 | 73.3 | 119.8 |

*outside the scope of the present invention

TABLE 4

| test specimen No. | alloy composition (wt. %) | | | | | | | Zr + impurities | tensile strength at 400° C. (kg/mm²) | | weight gain by oxidation (mg/dm²) | |
|---|---|---|---|---|---|---|---|---|---|---|---|---|
| | Nb | Y₂O₃ | oxides of rare earth elements | Fe | Cr | Mo | V | | parent metal | weld metal | parent metal | weld metal |
| comparative Zr alloy sheets | | | | | | | | | | | | |
| 70 | 2.10* | 0.12 | — | — | — | — | — | bal. | 19.5 | 19.1 | 44.9 | 48.2 |
| 71 | 2.01* | 0.08 | — | — | — | — | — | " | 18.3 | 18.8 | 43.1 | 46.5 |
| 72 | 1.83* | 0.92 | — | — | — | — | — | " | 17.9 | 18.1 | 40.5 | 44.4 |
| 73 | 2.33* | — | Nd:0.04 | — | — | — | — | " | 20.1 | 20.6 | 45.4 | 49.1 |
| 74 | 1.66* | — | Tb:0.11 | 0.48 | — | 0.12 | — | " | 20.5 | 21.1 | 36.6 | 39.8 |
| 75 | 1.94* | 0.46 | Yb:0.03 | 0.20 | 0.09 | — | 0.07 | " | 23.9 | 24.1 | 39.2 | 41.1 |
| 76 | 2.25* | 0.21 | Ho:0.10 | 0.13 | 0.10 | 0.06 | 0.08 | " | 26.1 | 25.8 | 41.9 | 45.0 |
| 77 | 3.92 | 0.10 | — | 1.14* | — | — | — | " | 51.7 | 51.1 | 98.3 | 104.5 |
| 78 | 3.96 | — | Nd:0.10 | — | 1.25* | — | — | " | 53.0 | 52.5 | 89.8 | 100.4 |
| 79 | 4.11 | 0.05 | Tb:0.02 | — | — | 1.14* | — | " | 54.0 | 53.3 | 102.2 | 125.1 |
| 80 | 4.38 | 0.22 | — | — | — | — | 1.29* | bal. | 58.6 | 59.1 | 101.9 | 128.4 |
| 81 | 2.58 | —* | —* | — | — | — | — | " | 32.6 | 18.1 | 49.2 | 90.3 |
| 82 | 4.49 | —* | —* | — | — | — | — | " | 43.8 | 21.2 | 59.4 | 101.1 |
| 83 | 7.40 | —* | —* | — | — | — | — | " | 63.0 | 40.3 | 73.3 | 122.8 |
| 84 | 7.83 | —* | —* | 0.19 | — | 0.48 | — | " | 69.1 | 48.0 | 70.2 | 111.2 |

TABLE 4-continued

| test speci- men No. | alloy composition (wt. %) | | | | | | | tensile strength at 400° C. (kg/mm²) | | weight gain by oxidation (mg/dm²) | |
|---|---|---|---|---|---|---|---|---|---|---|---|
| | Nb | Y₂O₃ | oxides of rare earth elements | Fe | Cr | Mo | V | Zr + impu- rities | parent metal | weld metal | parent metal | weld metal |
| 85 | 9.89 | —* | —* | 0.31 | — | — | 0.13 | " | 74.5 | 51.1 | 77.6 | 126.0 |
| 86 | 5.09 | —* | —* | 0.15 | 0.43 | 0.13 | — | " | 57.7 | 33.8 | 58.2 | 104.3 |
| 87 | 5.14 | —* | —* | — | 0.12 | 0.11 | 0.41 | " | 57.2 | 35.2 | 57.9 | 98.1 |
| 88 | 5.10 | —* | —* | 0.21 | 0.10 | 0.23 | 0.08 | " | 58.1 | 34.6 | 56.6 | 99.4 |

*outside the scope of the present invention

It will be apparent from the Tables 1 and 2 that the Zr alloy sheet test specimens Nos. 1 to 44 according to the present invention exhibited very little reduction in the desired properties of the parent metal and maintained to a great extent excellent properties of high tensile strength and corrosion resistance in the weld metal. On the other hand, it will be apparent from Tables 3 and 4, that the comparative Zr alloy sheet test specimens which are outside the scope of the present invention with a very low Nb content, and very high content(s) of Fe, Cr, Mo and V, exhibited inferior properties in the parent metal as well as in the weld metal.

It will be also apparent from the Tables 3 and 4 that the comparative Zr alloy (conventional Zr alloy) sheet specimens Nos. 62 to 69 and 81 to 88, which did not contain any of Y and rare earth elements and oxides thereof exhibit a significant decrease of the desired properties particularly in the weld metal. As can be seen from the foregoing examples, the Zr alloys of the present invention do not exhibit any significant decrease in tensile strength, creep characteristics, and corrosion resistance in the weld metal, when used in producing spacer grids for nuclear reactor fuel claddings.

The Zr alloy of the present invention will therefore offer great benefits in the art due to its high and stable performance for prolonged periods of time.

Although the present invention has been explained with reference to preferred examples, it will be clearly understood to those skilled in the art that the present invention is not restricted to only such examples but many variations and modifications may be made without departing from the spirit and scope of the present invention.

What is claimed is:

1. A zirconium alloy for use in spacer grids for nuclear reactor fuel claddings, consisting essentially of, on a weight percent basis,
   2.5 to 10% Nb,
   0.01 to 1.5% of one or more components selected from the group consisting of oxides of Y and oxides of rare earth elements, and
   the remainder being Zr and incidental impurities.

2. A zirconium alloy for use in spacer grids for nuclear reactor fuel claddings, consisting essentially of, on a weight basis,
   2.5 to 10% Nb,
   0.01 to 1.5% of one or more components selected from the group consisting of oxides of Y and oxides of rare earth elements,
   0.05 to 1% by weight or one or more elements selected from the group consisting of Fe, Cr, Mo and V,
   and the remainder being Zr and incidental impurities.

3. A zirconium alloy according to claim 1, wherein the Nb is in an amount of 4 to 7.5% by weight.

4. A zirconium alloy according to claim 2, wherein the Nb is in an amount of 4 to 7.5% by weight.

5. A zirconium alloy for use in spacer grids for nuclear reactor fuel claddings, consisting essentially of, on a weight percent basis,
   2.5 to 10% Nb,
   0.01 to 1.5% of one or more oxide components selected from the group consisting of oxides of Y, Nd, Tb, Yb, Ho and misch metal, and
   the remainder being Zr and incidental impurities.

6. A zirconium alloy for use in spacer grids for nuclear reactor fuel claddings, consisting essentially of, on a weight basis,
   2.5 to 10% Nb,
   0.01 to 1.5% of one or more oxide components selected from the group consisting of oxides of Y, Nd, Tb, Yb, Ho and misch metals,
   0.05 to 1% by weight of one or more elements selected from the group consisting of Fe, Cr, Mo and V, and
   the remainder being Zr and incidental impurities.

7. A zirconium alloy according to claim 5, wherein the oxide component is Y oxide.

8. A zirconium alloy according to claim 5, wherein the oxide component is Nd oxide.

9. A zirconium alloy according to claim 5, wherein the oxide component is Tb oxide.

10. A zirconium alloy according to claim 5, wherein the oxide component is Yb oxide.

11. A zirconium alloy according to claim 5, wherein the oxide component is Ho oxide.

12. A zirconium alloy according to claim 5, wherein the oxide component is a misch metal oxide.

13. A zirconium alloy according to claim 6, wherein the oxide component is Y oxide.

14. A zirconium alloy according to claim 6, wherein the oxide component is Nd oxide.

15. A zirconium alloy according to claim 6, wherein the oxide component is Tb oxide.

16. A zirconium alloy according to claim 6, wherein the oxide component is Yb oxide.

17. A zirconium alloy according to claim 6, wherein the oxide component is Ho oxide.

18. A zirconium alloy according to claim 6, wherein the oxide component is a misch metal oxide.

19. A zirconium alloy according to claim 5, wherein the Nb is in an amount of 4 to 7.5% by weight.

20. A zirconium alloy according to claim 6, wherein the Nb is in an amount of 4 to 7.5% by weight.

* * * * *